United States Patent
Liu et al.

(10) Patent No.: US 8,900,751 B2
(45) Date of Patent: Dec. 2, 2014

(54) ELECTRODE POWDER AND ELECTRODE PLATE FOR LITHIUM ION BATTERY

(71) Applicant: Industrial Technology Research Institute, Hsinchu (TW)

(72) Inventors: Chia-Erh Liu, Hsinchu (TW); Shih-Chieh Liao, Taoyuan County (TW); Chao-Ho Tsai, New Taipei (TW); Ya-Chi Chang, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/726,556

(22) Filed: Dec. 25, 2012

(65) Prior Publication Data

US 2014/0147749 A1    May 29, 2014

(30) Foreign Application Priority Data

Nov. 26, 2012 (TW) .............................. 101144161 A

(51) Int. Cl.
*H01M 4/13* (2010.01)
*H01M 4/38* (2006.01)
*B82Y 30/00* (2011.01)

(52) U.S. Cl.
CPC ............... *H01M 4/382* (2013.01); *B82Y 30/00* (2013.01); *Y02E 60/122* (2013.01)
USPC ....................................................... 429/223

(58) Field of Classification Search
CPC . Y02E 60/122; Y02E 60/12; H01M 10/0525; H01M 10/052; H01M 4/525; H01M 4/131; H01M 4/505; H01M 4/485; H01M 2004/021; H01M 4/382

USPC ...................................... 429/218, 223, 231.95
See application file for complete search history.

(56) References Cited

U.S. PATENT DOCUMENTS

| | | | |
|---|---|---|---|
| 6,440,610 B1 * | 8/2002 | Sheem et al. | 429/231.8 |
| 6,787,232 B1 | 9/2004 | Chiang et al. | |
| 7,205,072 B2 | 4/2007 | Kang et al. | |
| 7,465,520 B2 | 12/2008 | Belharouak et al. | |
| 8,586,182 B2 * | 11/2013 | Suzuki et al. | 428/403 |
| 2006/0246352 A1 * | 11/2006 | Kweon et al. | 429/231.95 |
| 2010/0285358 A1 * | 11/2010 | Cui et al. | 429/218.1 |

(Continued)

FOREIGN PATENT DOCUMENTS

| | | |
|---|---|---|
| CN | 1967910 | 5/2007 |
| CN | 101300694 | 11/2008 |

(Continued)

OTHER PUBLICATIONS

Hong et al., "Nano SIMS characterization of boron- and aluminum-coated LiNi1/3Co1/3Mn1/3O2 cathode materials for lithium secondary ion batteries", J Appl Electrochem, Dec. 2011, vol. 42, p. 41-p. 46.

(Continued)

*Primary Examiner* — Stewart Fraser
(74) *Attorney, Agent, or Firm* — Jianq Chyun IP Office

(57) ABSTRACT

Provided is an electrode powder and an electrode plate for a lithium ion battery. The electrode powder includes a core and a nano-coating layer. The core contains a lithium compound. The nano-coating layer is disposed on a surface of the core and consists of a plurality of nanosheets.

17 Claims, 9 Drawing Sheets

(56) References Cited

U.S. PATENT DOCUMENTS

| | | | |
|---|---|---|---|
| 2011/0111304 A1* | 5/2011 | Cui et al. | 429/231.8 |
| 2011/0143200 A1 | 6/2011 | Lee et al. | |
| 2011/0223480 A1 | 9/2011 | Wee et al. | |
| 2011/0309290 A1* | 12/2011 | Paulsen et al. | 252/182.1 |
| 2011/0309306 A1* | 12/2011 | Zhou et al. | 252/500 |
| 2012/0134914 A1* | 5/2012 | Paulsen et al. | 423/594.15 |
| 2012/0183856 A1* | 7/2012 | Cui et al. | 429/223 |
| 2012/0225357 A1 | 9/2012 | Jeoung | |

FOREIGN PATENT DOCUMENTS

| | | |
|---|---|---|
| CN | 102244251 | 11/2011 |
| CN | 102394304 | 3/2012 |
| JP | 09-245836 | 9/1997 |
| JP | 10-294100 | 11/1998 |
| JP | 2000306584 | 11/2000 |
| JP | 2001028265 | 1/2001 |
| JP | 2001291518 | 10/2001 |
| JP | 2001313034 | 11/2001 |
| JP | 2005078800 | 3/2005 |
| JP | 2006190687 | 7/2006 |
| JP | 2007018985 | 1/2007 |
| JP | 2008103345 | 5/2008 |
| JP | 2009152214 | 7/2009 |
| JP | 2009218217 | 9/2009 |
| JP | 2012028231 | 2/2012 |
| JP | 2012074240 | 4/2012 |
| JP | 2012209064 | 10/2012 |
| KR | 20070008115 | 1/2007 |
| TW | I287890 | 10/2007 |
| TW | I363449 | 5/2012 |
| WO | 2005119820 | 12/2005 |
| WO | 2009014399 | 1/2009 |

OTHER PUBLICATIONS

Chang et al., "Effects of ZnO coating on electrochemical performance and thermal stability of LiCoO2 as cathode material for lithium-ion batteries", Journal of Power Sources, Jul. 2009, vol. 195, p. 320-p. 326.

Yang et al., "Synthesis and electrochemical properties characterization of SnO2-coated LiNi1/3Co1/3Mn1/3O2 cathode material for lithium ion batteries", Supplemental Proceedings: vol. 1: Fabrication, Materials, Processing and Properties TMS (The Minerals, Metals & Materials Society), 2009, Feb. 2009, p. 607-p. 614.

Liu et al., "Kinetics of conventional carbon coated-Li3V2(PO4)3 and nanocomposite Li3V2(PO4)3/graphene as cathode materials for lithium ion batteries", Journal of Materials Chemistry, Mar. 2012, vol. 22, p. 11039-p. 11047.

Cho et al., "LiNi0.8Co0.15Al0.05O2 cathode materials prepared by TiO2 nanoparticle coatings on Ni0.8Co0.15Al0.05 (OH)2 precursors", Electrochimica Acta, Sep. 2010, vol. 56, p. 333-p. 339.

Cho et al., "Significant Improvement of LiNi0.8Co0.15Al0.05O2 Cathodes at 60° C. by SiO2 Dry Coating for Li-Ion Batteries", Journal of the Electrochemical Society, Apr. 2010, vol. 157, p. A625-p. A629.

Kim et al., "V2O5-Coated TiO2 Nanorod Electrodes", Journal of the Electrochemical Society, May 2010, vol. 157, p. A802-p. A807.

Chen et al., "Effect of a ZrO2 Coating on the Structure and Electrochemistry of LixCoO2 When Cycled to 4.5 V", Electrochemical and Solid-State Letters, Aug. 2002, vol. 5, p. A213-p. A216.

Cho et al., "Improvement of Structural Stability of LiCoO2 Cathode during Electrochemical Cycling by Sol-Gel Coating of SnO2", Electrochemical and Solid-State Letters, Jun. 2000, vol. 3, p. 362-p. 365.

Sun et al., "Synthesis and Electrochemical Properties of ZnO-Coated LiNi0.5Mn1.5O4 Spinel as 5 V Cathode Material for Lithium Secondary Batteries", Electrochemical and Solid-State Letters, Mar. 2002, vol. 5, p. A99-p. A102.

Li et al., "Cathode materials modified by surface coating for lithium ion batteries", Electrochimica Acta, Dec. 2005, vol. 51, p. 3872-p. 3883.

"Office Action of Taiwan Counterpart Application", issued on Jun. 18, 2014, p. 1-p. 6.

"Office Action of Japan Counterpart Application", issued on Jul. 15, 2014, p. 1-p. 3.

* cited by examiner

ELECTRODE POWDER AND ELECTRODE PLATE FOR LITHIUM ION BATTERY

CROSS-REFERENCE TO RELATED APPLICATION

This application claims the priority benefit of Taiwan application serial no. 101144161, filed on Nov. 26, 2012. The entirety of the above-mentioned patent application is hereby incorporated by reference herein and made a part of this specification.

TECHNICAL FIELD

The disclosure relates to an electrode powder and an electrode plate for a lithium ion battery.

BACKGROUND

The current technological trend of the lithium ion battery is to develop a high-capacity and high-power lithium ion battery, and therefore the performance and the safety thereof in a high temperature environment are key issues. The life of the lithium ion battery is significantly related to the stability of the materials of the anode and the cathode of the lithium ion battery. Inside the lithium ion battery, the electrolyte solution is in direct contact with the surface of the electrode material, and a chemical reaction occurs between the two during charge-discharge, producing byproducts and increasing impedance, and at the same time dissolving the metal and the oxygen ions of the electrode material. Therefore, the structure and the composition of the electrode material are changed. The phenomenon is particularly evident when using the battery at high temperature (above 45° C.) or because of heat runaway due to the battery generating electricity under high power. The battery performance declines rapidly from this phenomenon.

One known solution to above phenomenon is to coat a layer of high concentration metal ions on the surface of the active material of the electrode to reduce dissolution of the metal ions of the electrode material. Moreover, a protective layer is added to the surface of the active material of the electrode to improve the stability of the active material during charge-discharge at high temperature, whereby slowing the decline of the electrical properties of the battery. However, the protective layer may affect the ion transfer and the electron transfer between the active material of the electrode and the electrolyte solution, therefore decreasing the charge-discharge efficiency.

SUMMARY

One of exemplary embodiments comprises an electrode powder for a lithium ion battery. The electrode powder comprises a core and a nano-coating layer. The core contains a lithium compound. The nano-coating layer is disposed on a surface of the core and consists of a plurality of nanosheets.

Another of exemplary embodiments comprises an electrode plate for a lithium ion battery. The electrode plate is made from above electrode powder for the lithium ion battery.

Yet another of exemplary embodiments comprises an electrode plate for a lithium ion battery. The electrode plate includes an electrode plate and a nano-coating layer. The nano-coating layer is disposed on a surface of the electrode plate and consists of a plurality of nanosheets.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
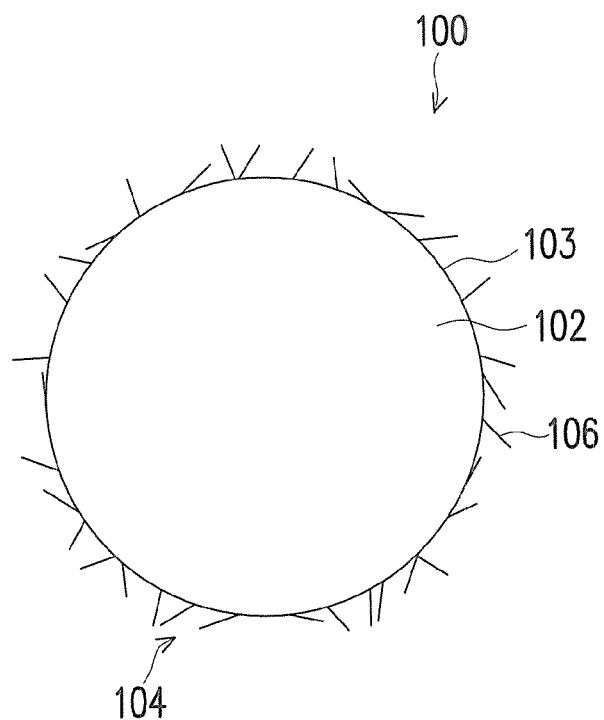
FIG. 1A is a cross-sectional schematic diagram illustrating an electrode powder for a lithium ion battery according to the first exemplary embodiment.

FIG. 1A is a cross-sectional schematic diagram illustrating an electrode powder for a lithium ion battery according to the first exemplary embodiment.

Referring to FIG. 1A, the electrode powder for a lithium ion battery 100 in the first exemplary embodiment includes a core 102 and a nano-coating layer 104. The core 102 contains a compound that may release lithium ions or combine with lithium ions under appropriate conditions (in the art, the compound is also sometimes referred to as "active material") such as lithiated metal oxide, and specific examples may be $LiNi_{0.5}Co_{0.5}O_2$ or $LiNi_{0.5}Co_{0.2}Mn_{0.3}O_2$, but is not limited thereto. The nano-coating layer 104 is disposed on a surface 103 of the core 102, wherein the nano-coating layer 104 consists of a plurality of nanosheets 106.

In this exemplary embodiment, a material of the nanosheet 106 includes a metal compound, such as hydrous metal oxide For example, the hydrous metal oxide contains a metal element selected from Al, Zn, Sn, Si, Mg, V, Zr, Ti, Ni, and combinations thereof. A buffer zone is formed on the surface 103 of the nano-coating layer 104 having protective function but does not completely cover the surface 103. The nanosheets 106 is less active, and does not react with the electrolyte easily. The steric hindrance effect caused by the nanosheets 106 prevents contact between the electrolyte solution and the core 102 to certain degree, therefore the core 102 is protected and the occurrence of side effects is delayed. Since the buffer zone does not completely cover the surface 103, the nano-coating layer 104 may collapse from the core 102 even if the core 102 expands or shrinks during charge-discharge. Moreover, when the core 102 is protected, the electrical performance of the lithium ion battery is not affected by the complete separation of the core 102 and the electrolyte solution.

Figure 1B:
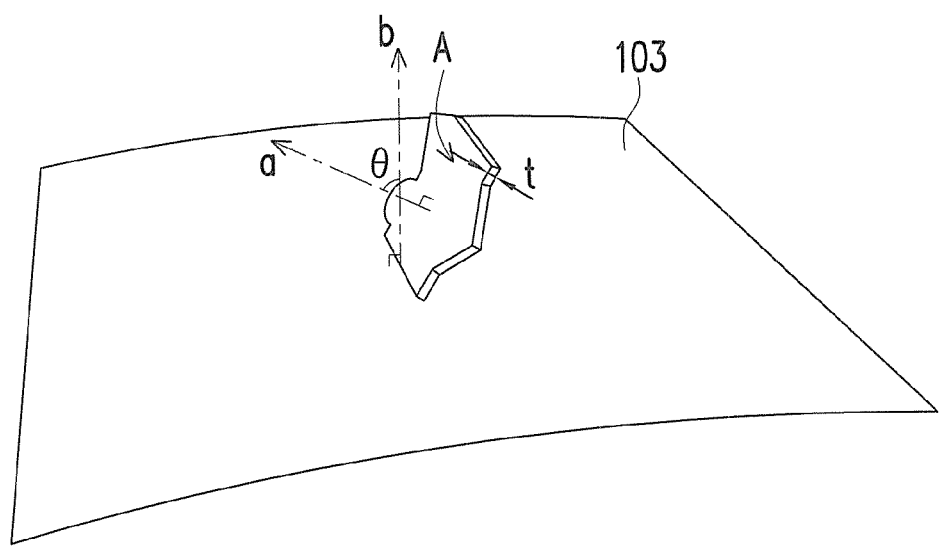
FIG. 1B is a partially enlarged perspective view of FIG. 1A.

FIG. 1B is a partially enlarged perspective view of FIG. 1A. Referring to FIG. 1B, in the specification, each of the "nanosheets" is a three-dimensional structure, wherein the size of one dimension is far less than the sizes of the other two dimensions. For instance, the size of each nanosheet 106 in the thickness direction is far less than the sizes of the other two dimensions. In an embodiment, the thickness t of the nanosheet 106 may be less than 100 nm. In another embodiment, the thickness t of the nanosheet 106 may be less than 20 nm. In an embodiment, the thickness t of the nanosheet 106 may be greater than 5 nm. Moreover, the sizes of the two dimensions perpendicular to the thickness direction may individually be greater than 100 nm, or greater than 1 μm in other embodiments.

The nanosheet 106 has a flaky surface A. In an embodiment, an area of the flaky surface A is less than 1 μm². In another embodiment, the area of the flaky surface A is greater than 400 nm². It should be noted that, although the flaky surface A in FIG. 1B and FIG. 1C is illustrated as a standard plane, in other embodiments, the flaky surface A is not necessarily a flat plane, and may be an irregularly curved plane.

Referring to FIG. 1B, in an embodiment, an included angle between the flaky surface A and the surface 103 is between 0 degree and 180 degrees. In the disclosure, the included angle between a surface and another surface refers to the included angle between the normal vectors of the two surfaces. For instance, "the included angle between the flaky surface A and the surface 103" refers to the included angle θ between the normal vector a of the flaky surface A and the normal vector b of the surface 103.

As shown in FIG. 1A, in the embodiment, the included angles between the flaky surface A of each nanosheet 106 and the surface 103 are different. In other words, overall, the nanosheet 106 is randomly disposed on the surface 103. However, the disclosure is not limited thereto. In other embodiments, the nanosheet 106 may also be regularly disposed on the surface 103 with the same included angles between each flaky surface A and the surface 103.

Figure 1C:
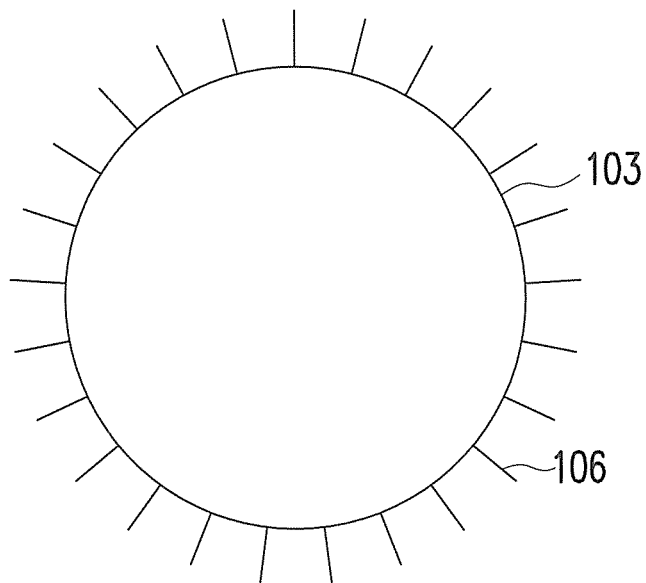
FIG. 1C and FIG. 1D are cross-sectional schematic diagrams of two examples of the electrode powders for the lithium ion battery in the first exemplary embodiments.

For instance, in the implementation of FIG. 1C, the nanosheet 106 is regularly disposed on the surface 103 with a 90 degree included angle between each flaky surface A and the surface 103. In the implementation shown in FIG. 1D, the nanosheet 106 is regularly disposed on the surface 103 with a 0 degree included angle between each flaky surface A and the surface 103.

Figure 1D:
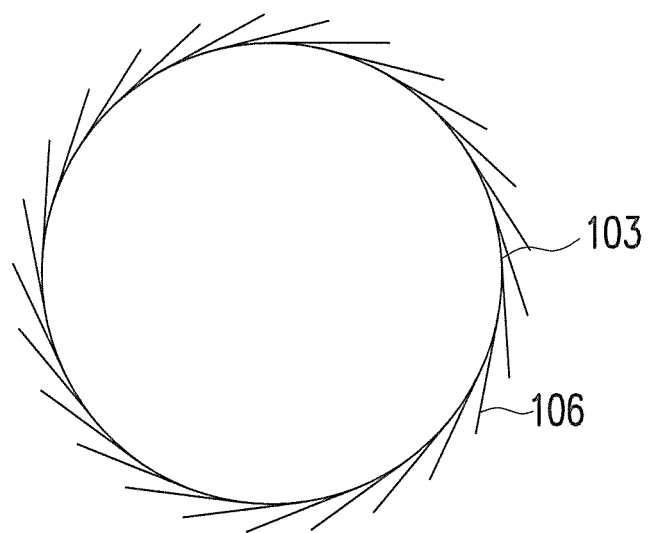

Since the surface 103 is usually a curved plane, the flaky surface A still does not completely cover the surface 103 even if the included angle between the flaky surface A and the surface 103 is very small, or even if it is 0 degree in the implementation (as shown in FIG. 1D). In other words, even in the implementation, the nano-coating layer 104 still has the effect of "protecting the core 102 without impairing the electrical performance".

It should be noted that, the descriptions relating to "the included angle between the flaky surface and the surface of the core" are to briefly explain the possible dispositions of the flaky surface in the embodiments to concisely convey the concepts of the disclosure to one of the ordinary skill in the art. The description method should not be viewed from an overly restrictive and purely mathematical point of view. For instance, it was mentioned that the flaky surface of the nanosheet 106 is not necessarily a perfectly flat plane. Moreover, the core 102 of the electrode powder for a lithium ion battery 100 is not necessarily spherical as illustrated in FIG. 1A, FIG. 1C, or FIG. 1D, but may have a surface with varying degrees of cavities. When the surface 103 of the core 102 is not a smooth curved plane, the surface 103 may not be able to define a unique normal vector. Nevertheless, any lithium ion battery having nanosheets with a similar morphology to the above described on the electrode powder is covered by the scope of the disclosure.

Moreover, the illustrations of the nanosheets 106 as independent of one another and separate structures in FIG. 1A to FIG. 1D are simplifications made in order to present the concepts of the disclosure with cross-sectional diagrams. In actuality, the nanosheets 106 may be intertwined, overlapped, or stacked, and the size, the direction, and the disposition on the surface 103 of each intertwining, overlapping, and stacking nanosheet 106 may still be defined by the previous description. The explanation is also applicable to the second exemplary embodiment described with reference to FIG. 2. Details of the embodiment of the nanosheets 106 are depicted in the electron microscope images in the <Experiment> section.

Figure 2:
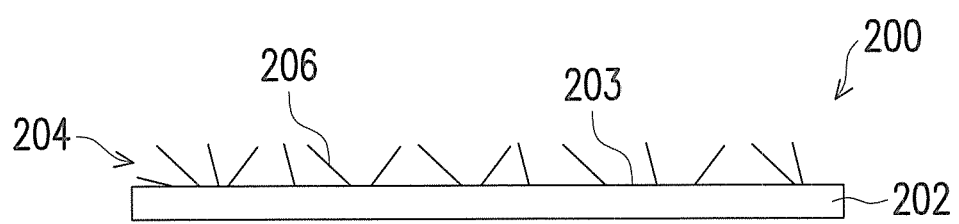
FIG. 2 is a cross-sectional schematic diagram illustrating an electrode plate for a lithium ion battery according to the second exemplary embodiment.

FIG. 2 is a schematic diagram illustrating an electrode plate for a lithium ion battery according to the second exemplary embodiment.

Referring to FIG. 2, the electrode plate for the lithium ion battery 200 includes an electrode plate 202 and a nano-coating layer 204. The nano-coating layer 204 is disposed on a surface 203 of the electrode plate 202 and consists of a plurality of the nanosheets 206.

The electrode plate 202 is, for instance, prepared by mixing an electrode powder for a lithium ion battery with a conductive agent and a binder to form a slurry. The slurry is coated on a metal foil such as an aluminum foil or a copper foil, and then dried. In particular, the electrode powder for the lithium ion battery may contain an active material, and may also be the electrode powder for the lithium ion battery having the nano-coating layer described in the first exemplary embodiment. Each of the nanosheet 206 on the electrode plate 202 may have the same morphology as the one in the first exemplary embodiment, and is not specified otherwise.

EXPERIMENT

An experimental example is listed in the following to further describe the characteristics and the effects of the disclosure. However, the disclosure is not limited to the following experimental example.

The electrode powder for a lithium ion battery is prepared in the following steps:

1. The precursor of the aluminum ion (aluminum isopropoxide, the precursor of the nano-coating layer) is dissolved in 100 ml to 150 ml of aqueous solution, then stirred for tens of minutes until a white and turbid homogeneous solution is formed.

2. The electrode powder (Mg-doped $LiNi_xCo_yMn_{1-x-y}O_2$) is slowly poured into the solution prepared in step 1 and stirred until the solution is evenly mixed.

3. The solution is stirred in room temperature with constant speed for 3 hours to 6 hours to evenly mix the precursor of the aluminum ion and the electrode powder.

4. The solution prepared in step 3 is filtered with a filter paper having the appropriate porosity to remove unreacted impurities, and the mud-like cathode material is collected from the filter paper.

5. The collected material in step 4 is put in an oven at 50° C. to 100° C. and baked for 10 minutes, then the black-grey powder is collected.

6. The powder collected in step 5 is put in a high temperature furnace and sintered for 2 hours to 5 hours at 200° C. to 900° C., and the electrode powder having a nano-coating layer is formed on the surface is obtained.

The composition and the morphology of the electrode powder for a lithium ion battery prepared in step 6 are identified with the analytical instruments (i.e. SEM, TEM, and EDX). Then, a button cell is formed, and differential scanning calorimetry, irreversible capacity, AC impedance, and cycle life tests are conducted. The results are as follows.

SEM

Figure 3A:
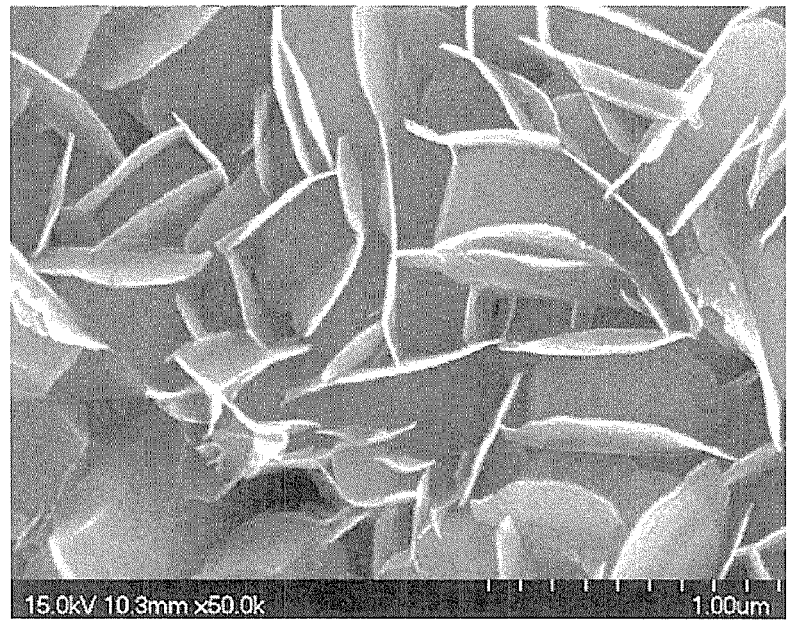
FIG. 3A to FIG. 3B are SEM images of an electrode powder for a lithium ion battery in the experiment.
Figure 3B:
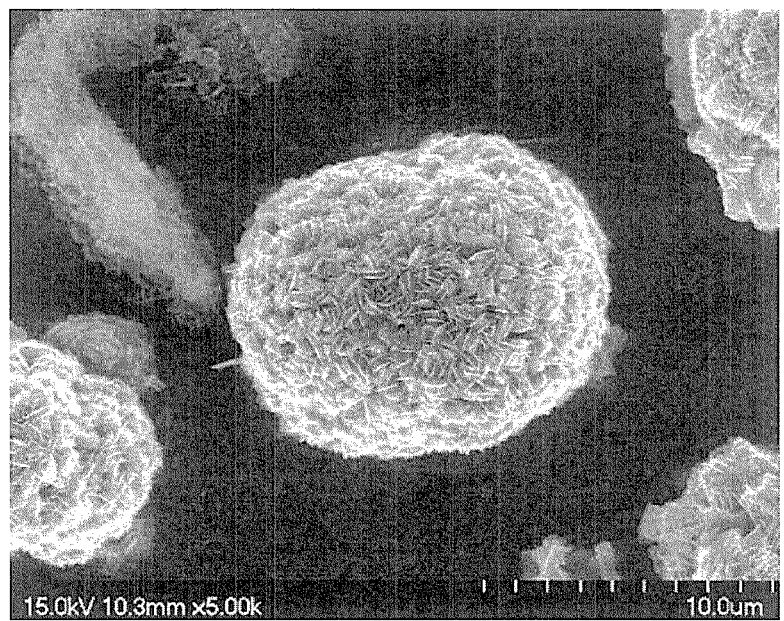

FIG. 3A to FIG. 3B are SEM images of an electrode powder for a lithium ion battery. The SEM images show that the surface of the coated electrode powder is covered by metal oxide nanosheets. Under different magnifications, it is seen that the effect is uniform and comprehensively appears on every electrode powder.

TEM & EDX

Figure 4A:
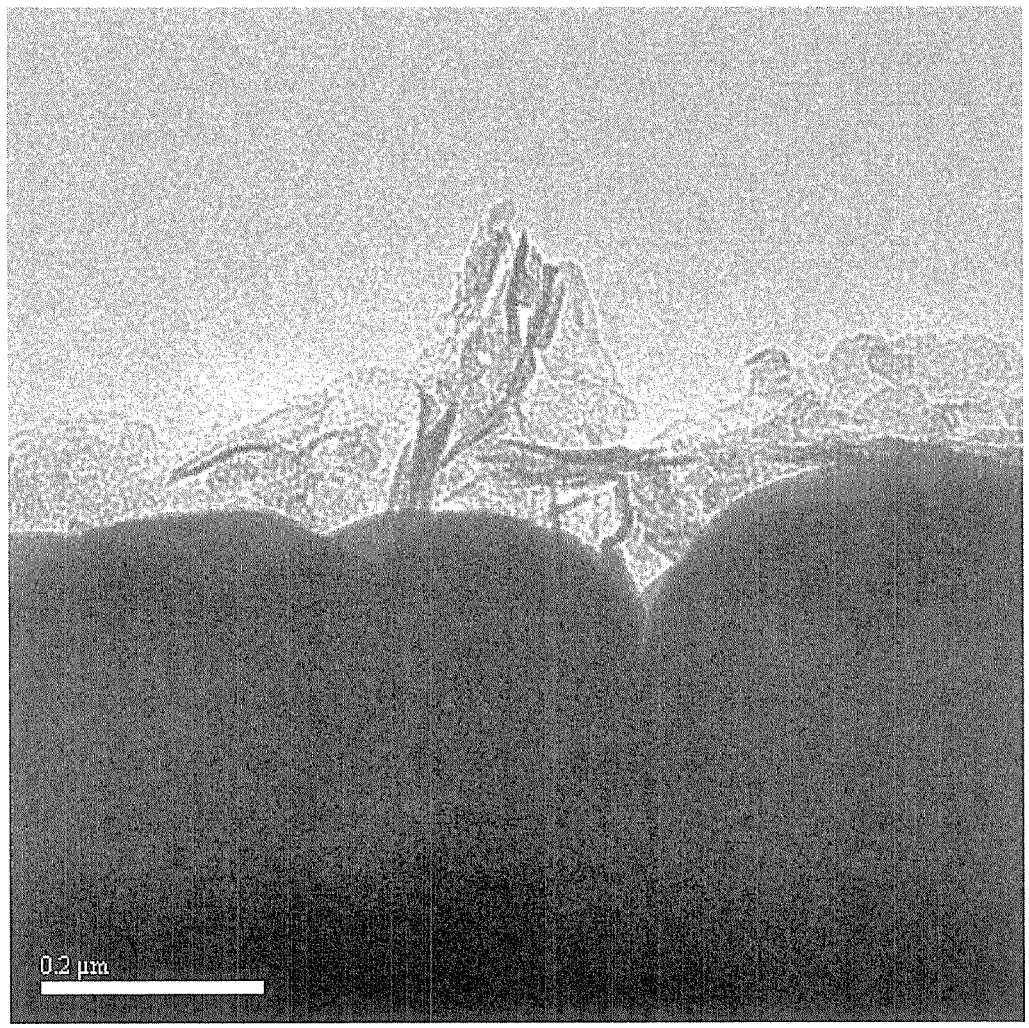
FIG. 4A is a TEM image of an electrode powder for a lithium ion battery in the experiment.
Figure 4B:
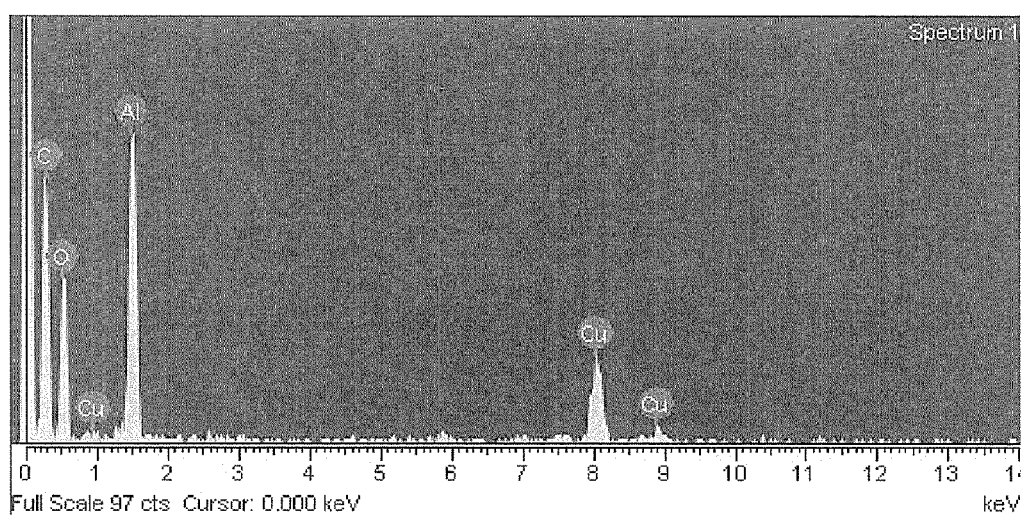
FIG. 4B is the analytical result of the EDX of the nanosheet of FIG. 4A.

FIG. 4A presents a TEM image of the surface of an electrode powder coated with metal oxide nanosheets. The irregular surface morphology corresponds to the three-dimensional flakes seen in the SEM image. The nanosheets are amorphous. In the TEM image, the contrast of the nanosheets and the core is significantly lighter, and it may be acquired from the different electron transmittance that the compositions are different. The composition of the metal oxide nanosheets in the TEM image of FIG. 4A is analyzed with EDX, and the result is presented in FIG. 4B. FIG. 4B shows that the aluminum content the nanosheets is very high, proving that the material of the nanosheets is indeed aluminum oxide and that the nanosheets are successfully adhered to the surface of the electrode powder. Moreover, since the synthetic environment is water, it is logically presumed that the metal oxide prepared by the synthesis method is in a hydrated state. The carbon and the copper signals observed in the EDX result come from the copper mesh (contains carbon film) used to fix the sample.

Differential Scanning Calorimetry (DSC)

Figure 5:
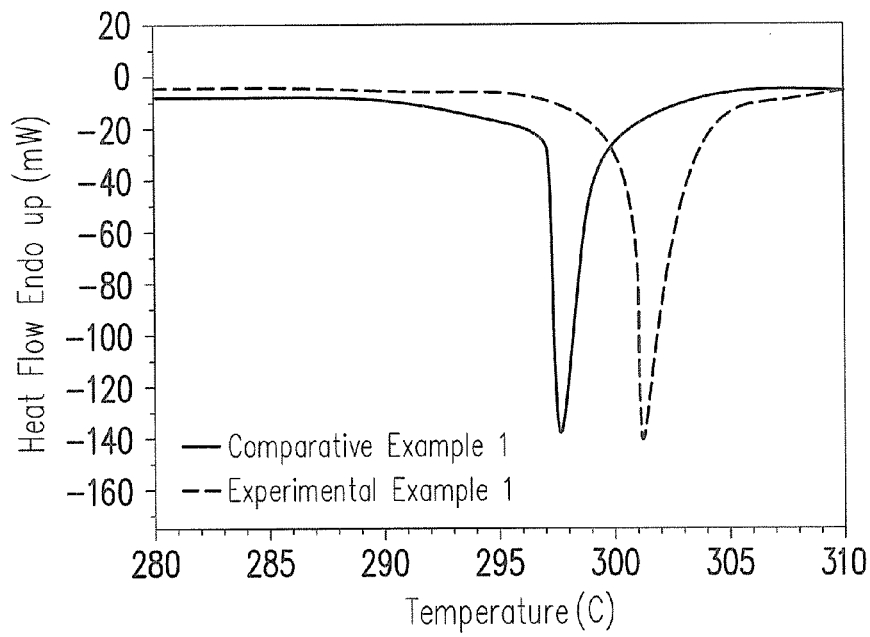
FIG. 5 is DSC result of experimental example 1 and comparative example 1.

The electrode powder for a lithium ion battery prepared with the previous method (experimental example 1) is tested with differential scanning calorimetry (DSC). At the same time, the electrode powder for a lithium ion battery without surface coating is used as comparative example 1, and is tested the same. The results are presented in FIG. 5. The figure show that, the exothermic peak of the electrode powder for a lithium ion battery without surface coating is 296.5° C., and the electrode powder for a lithium ion battery having a nano-coating layer and improved thermal stability has a delayed exothermic peak at 301.5° C.

Irreversible Capacity

Figure 6:
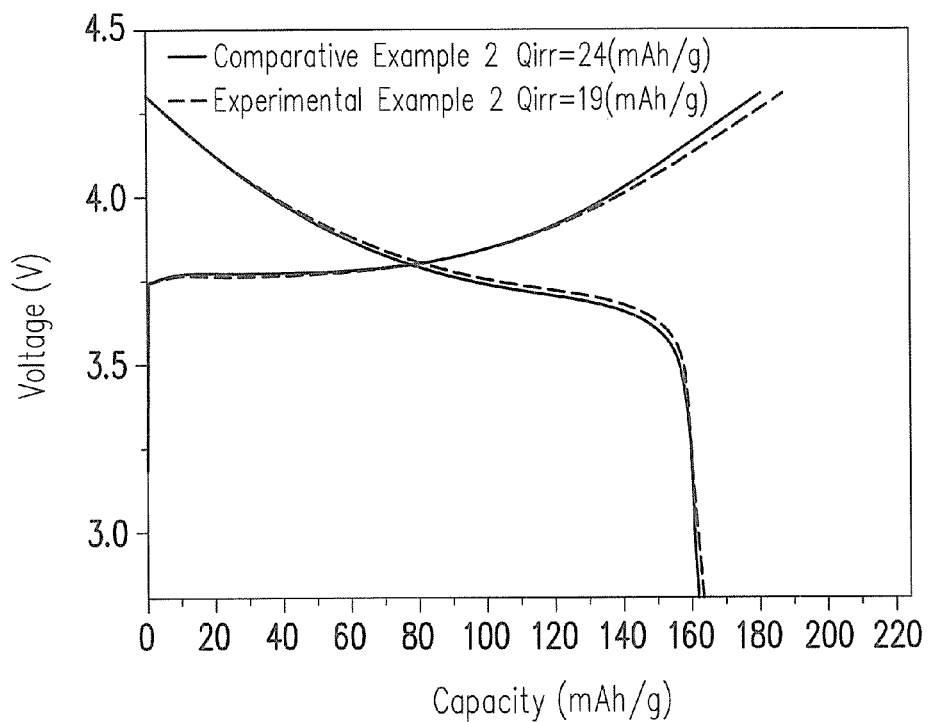
FIG. 6 is the test result of the irreversible capacity of experimental example 2 and comparative example 2.

The electrode powder for a lithium ion battery prepared with the method described previously is made into a coin cell and an irreversible capacity test is conducted (experimental example 2). The result is compared to that of the coin cell having an electrode powder without surface treatment (comparative example 2). Two charge-discharge cycles are performed at the rate of 0.2 C to observe if the flaky metal oxide has the desired protective effect. The results are presented in FIG. 6. According to FIG. 6, the lithium ion battery containing an electrode powder without surface treatment has an irreversible capacity of 24 mAh/g, and the lithium ion battery containing an electrode powder having a nano-coating layer has an irreversible capacity of 19 mAh/g.

The results confirm that the nano-coating layer successfully prevents contact between the powder material and the electrolyte solution, which reduces the byproducts from the chemical reactions and therefore lowers the irreversible capacity. It is also confirmed that the nano-coating layer does not affect the ion transfer and the electron transfer of the surface, with the starting capacity being the same as the lithium ion battery containing an electrode powder with an uncoated surface.

AC Impedance Test

Figure 7:
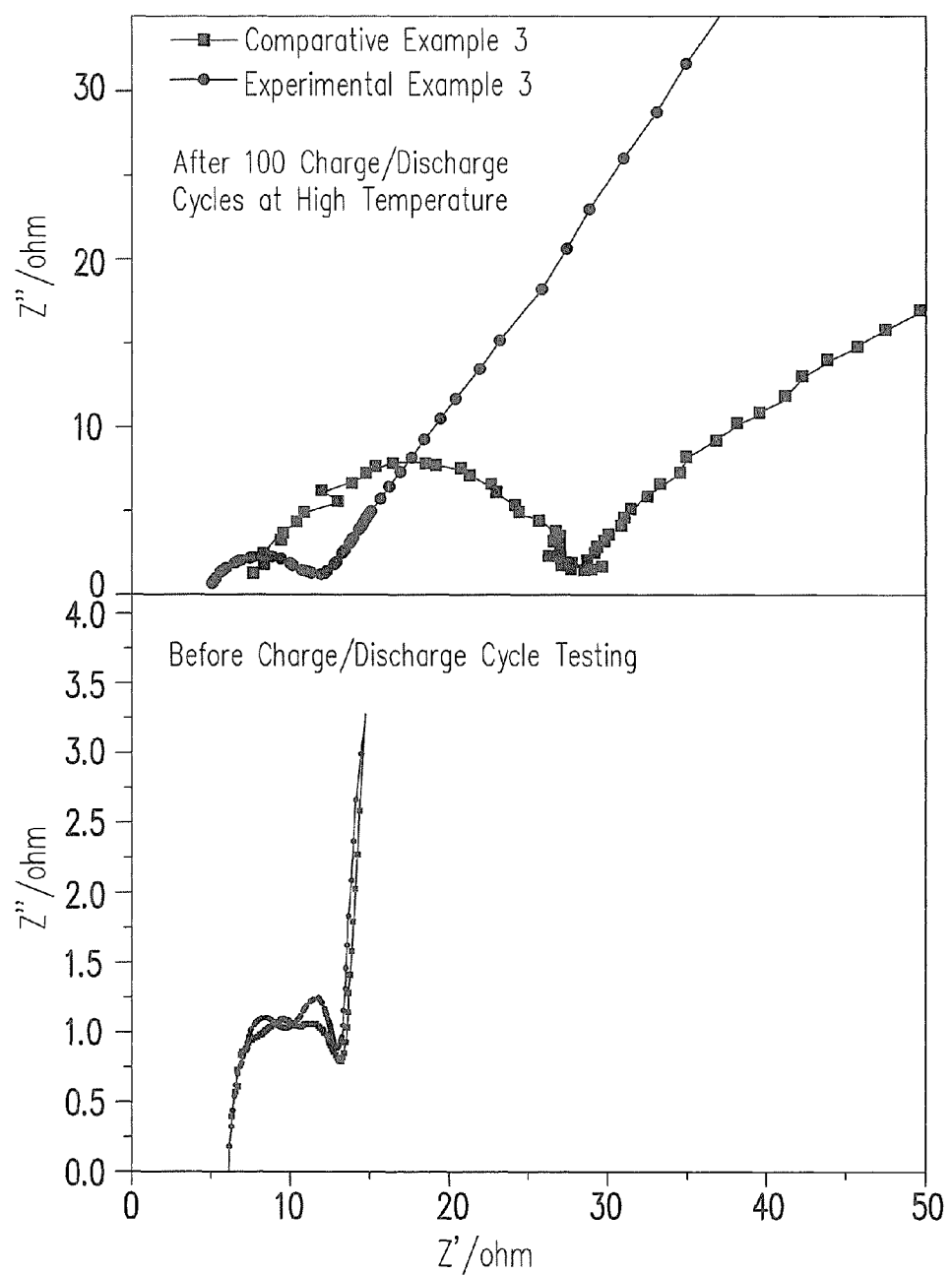
FIG. 7 is the test result of the AC impedance of experimental example 3 and comparative example 3.

The electrode powder for a lithium ion battery prepared with the method described previously is made into a half-cell (that is, the electrode powder for a lithium ion battery is used as the anode material, and together with the cathode containing pure lithium metal compose the charge-discharge system) (experimental example 3) for impedance measurement and is compared to the half-cell containing an electrode powder without surface treatment (comparative example 3). The results are presented in FIG. 7. FIG. 7 shows that the nano-coating layer does not impede the battery, and the impedance is the same as the impedance of the battery having an electrode powder without a nano-coating layer, at approximately 7Ω. The result corresponds to the effect of not losing starting capacitance.

After 100 charge-discharge cycles at a high temperature (55° C.), the battery having an electrode powder with surface treatment still maintains a 7Ω impedance, but the impedance of the battery having an electrode powder without the protection of a nano-coating layer reaches 22Ω, showing that the nano-coating layer effectively suppresses the reaction between the active material and the electrolyte solution in a high temperature environment, which reduces the generation of passivations.

Cycle Life Test

Figure 8:
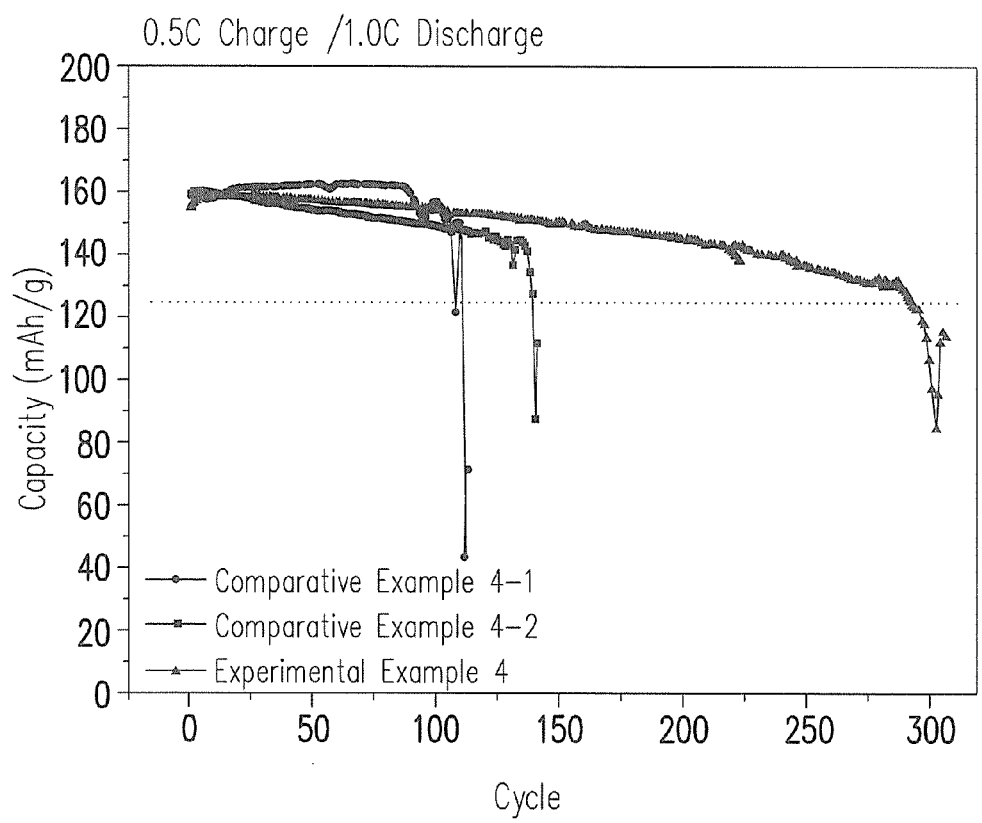
FIG. 8 is the test result of the battery cycle life of experimental example 4, comparative example 4-1, and comparative example 4-2.

Under the same conditions of the battery system, the cycle life of three following lithium ion batteries are tested and compared in a high temperature environment at 55° C. and at the rate of 0.5 C charge/1 C discharge: the electrode powder without a surface coating layer (comparative example 4-1), the electrode powder having a surface coating layer completely covering the active material (comparative example 4-2), and the electrode powder having a nano-coating layer consisting of nanosheets (experimental example 4). The results are presented in FIG. 8. As shown in FIG. 8, the battery of experimental example 4 still has 80% effective capacitance after 295 charge-discharge cycles, while the battery of comparative example 4-1 fails after only 110 charge-discharge cycles. The battery of comparative example 4-2 has better cycle life, but only to a small extend. The results correspond to the testings of the materials and the battery properties. The nano-coating layer in experimental example 4 may improve the thermal stability and the structural stability of the material, and decrease the probability of chemical reactions on the surface, therefore significantly increasing the battery life.

In summary, the nano-coating layer disclosed in the exemplary embodiments of the disclosure may be coated on the surface of an active material of an electrode that delays the reaction between the active material and the electrolyte solution with the steric hindrance effect. Compared to the conventional coating layer of an electrode material, the nanosheet does not completely cover the surface of the active material and has less influence on the electrical properties of the lithium ion battery. Moreover, due to the nanosheets not completely covering the surface of the active material, the nano-coating layer does not fall off easily from the active material when the active material expands and contracts during charge-discharge. Therefore, the formation of nanosheets increases the chemical stability and the physical stability of the active material of an electrode.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electrode powder for a lithium ion battery, comprising:
   a core, comprising a lithium compound; and
   a nano-coating layer, disposed on a surface of the core, wherein the nano-coating layer consists of a plurality of nanosheets, wherein a material of the nanosheets comprises a metal oxide, and
   each of the nanosheets is a three-dimensional structure having a thickness, a width and a length, wherein a ratio of the thickness to the length is less than 0.1, and a ratio of the thickness to the width is less than 0.1.

2. The electrode powder for the lithium ion battery of claim 1, wherein the thickness of the three-dimensional structure is less than 100 nm.

3. The electrode powder for the lithium ion battery of claim 1, wherein each of the plurality of nanosheets has a flaky surface, and an included angle between the flaky surface and the surface of the core is between 0 degrees and 180 degrees.

4. The electrode powder for the lithium ion battery of claim 3, wherein an area of the flaky surface is less than 1 μm².

5. The electrode powder for the lithium ion battery of claim 3, wherein each of the plurality of nanosheets is regularly disposed on the surface of the core with the same included angle between each of the flaky surfaces and the surface of the core.

6. The electrode powder for the lithium ion battery of claim 3, wherein each of the plurality of nanosheets is irregularly disposed on the surface of the core with a different included angle between each of the flaky surfaces and the surface of the core.

7. The electrode powder for the lithium ion battery of claim 1, wherein the metal oxide comprises hydrous metal oxide.

8. The electrode powder for the lithium ion battery of claim 1, wherein the metal oxide contains a metal element selected from Al, Zn, Sn, Si, Mg, V, Zr, Ti, Ni, and combinations thereof.

9. An electrode plate for a lithium ion battery made from an electrode powder for a lithium ion battery as claimed in claim 1.

10. An electrode plate for a lithium ion battery, comprising:
    an electrode plate; and
    a nano-coating layer, disposed on a surface of the electrode plate, wherein the nano-coating layer consists of a plurality of nanosheets, wherein a material of the nanosheets comprises a metal oxide, and
    each of the nanosheets is a three-dimensional structure having a thickness, a width and a length, wherein a ratio of the thickness to the length is less than 0.1, and a ratio of the thickness to the width is less than 0.1.

11. The electrode plate for the lithium ion battery of claim 10, wherein the thickness of the three-dimensional structure is less than 100 nm.

12. The electrode plate for the lithium ion battery of claim 10, wherein each of the plurality of nanosheets has a flaky surface, and an included angle between the flaky surface and the surface of the electrode plate is between 0 degree and 180 degrees.

13. The electrode plate for the lithium ion battery of claim 12, wherein an area of the flaky surface is less than 1 μm².

14. The electrode plate for the lithium ion battery of claim 12, wherein each of the plurality of nanosheets is regularly disposed on the surface of the electrode plate with the same included angle between each of the flaky surfaces and the surface of the electrode plate.

15. The electrode plate for the lithium ion battery of claim 12, wherein each of the plurality of the nanosheets is irregularly disposed on the surface of the electrode plate with a different included angle between each of the flaky surfaces and the surface of the electrode plate.

16. The electrode plate for the lithium ion battery of claim 10, wherein the metal oxide comprises hydrous metal oxide.

17. The electrode plate for the lithium ion battery of claim 10, wherein the metal oxide contains a metal element selected from Al, Zn, Sn, Si, Mg, V, Zr, Ti, Ni, and combinations thereof.

* * * * *